Aug. 25, 1936.   R. S. SANFORD   2,051,905
CLUTCH CONTROL MECHANISM
Filed Nov. 23, 1932   2 Sheets-Sheet 1

INVENTOR.
ROY S. SANFORD
BY H. O. Clayton
ATTORNEY

Aug. 25, 1936.  R. S. SANFORD  2,051,905
CLUTCH CONTROL MECHANISM
Filed Nov. 23, 1932  2 Sheets—Sheet 2

INVENTOR.
ROY S. SANFORD
BY
ATTORNEY

Patented Aug. 25, 1936

2,051,905

UNITED STATES PATENT OFFICE 2,051,905

CLUTCH CONTROL MECHANISM

Roy S. Sanford, South Bend, Ind., assignor to Bendix Aviation Corporation, South Bend, Ind., a corporation of Delaware Application November 23, 1932, Serial No. 644,129

5 Claims. (Cl. 192—.01)

This invention relates to vacuum operated power means for operating the clutch of an automotive vehicle provided with a front wheel drive power plant.

The principal object of the invention is to adapt a power operated mechanism of this type for operation of the clutch mechanism of such a power plant and further to interconnect the control valve of the power mechanism with the accelerator, whereby there is provided a power operated means for disengaging and engaging the clutch with operation of the engine throttle.

A further object of the invention is to provide a slack adjuster in the connection between the movable element of the power means and the clutch, whereby the length of the connection is automatically increased, during the operation of the power means, to compensate for the normal wear of the driving and driven friction members of the clutch.

Other objects of the invention and desirable details of construction and combinations of parts will become apparent from the following detailed description of a preferred embodiment of the invention, the same being disclosed in the several figures of the drawings, in which.

Figure 1:
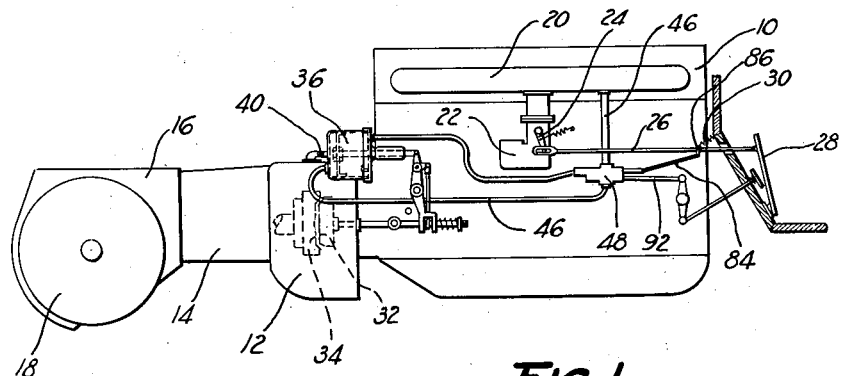
Figure 1 is a diagrammatic view of the invention disclosing the clutch operating power mechanism incorporated in an automotive vehicle of the front drive type.
Figures 2, 2A:
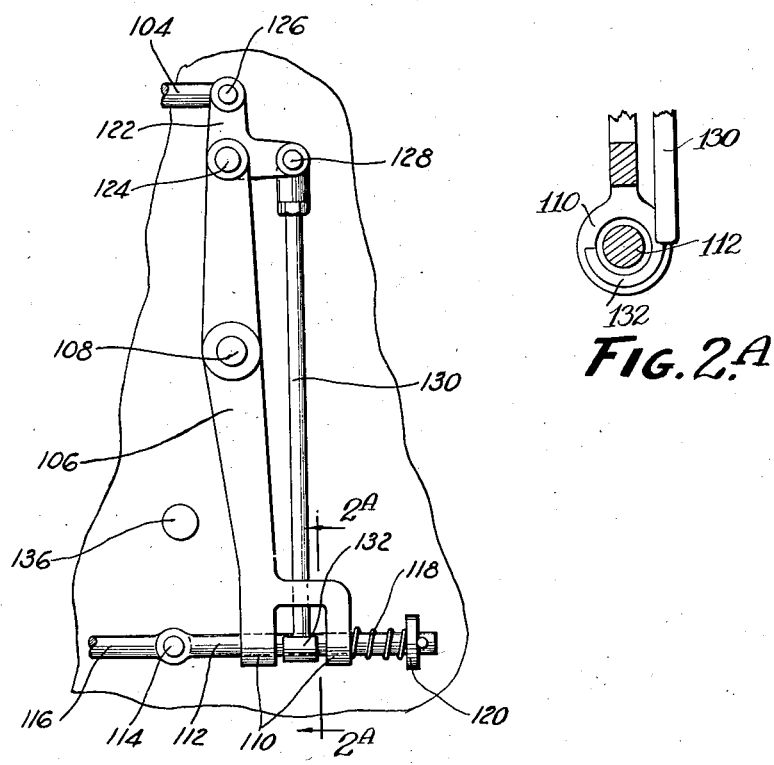
Figure 2 is a large scale fragmentary view of a portion of the connection between the clutch motor and clutch disclosing the details of the slack adjusting mechanism of the invention.
Figure 2A is a section taken on the line 2A—2A of Figure 2 disclosing, in detail, a portion of the slack adjusting mechanism.

Referring now to Figure 1 of the drawings illustrating a preferred embodiment of the invention, there is diagrammatically disclosed an automotive vehicle of the front drive type comprising conventional parts, such as an internal-combustion engine 10, clutch housing 12, transmission mechanism 14, differential mechanism 16 and brake mechanism 18. The engine structure includes the usual intake manifold 20 and carburetor 22, the latter provided with a spring retracted throttle operating lever 24 operable by a throttle link 26 pivotally connected to an accelerator pedal 28. The link and accelerator are returned to their off positions by a spring 30 secured to the dash of the vehicle.

The invention is directed to pressure differential operated power means for operating a conventional clutch mechanism, the latter comprising the usual driving and driven members 32 and 34. The principal element of the power means comprises a fluid operated motor 36, including a cylinder member 38, preferably pivotally secured to the clutch housing 12 at 40, and a reciprocable piston element 42 operably connected to the driven element 34 of the clutch by a plurality of interconnected links and levers, the structure of which will be described with greater detail hereinafter. The pivotal mounting of the cylinder upon the clutch housing provides a structure whereby variations in the relative positions of the parts of the mechanism, caused, for example, by the well-known weaving action during operation of the vehicle, are automatically compensated for to the end that the clutch may be effectively operated.

The intake manifold 20 of the engine provides a source of vacuum for energizing the clutch motor to disengage the clutch, the motor being connected at its suction end 44 to the manifold by a flexible fluid transmitting conduit 46.

Figure 5:
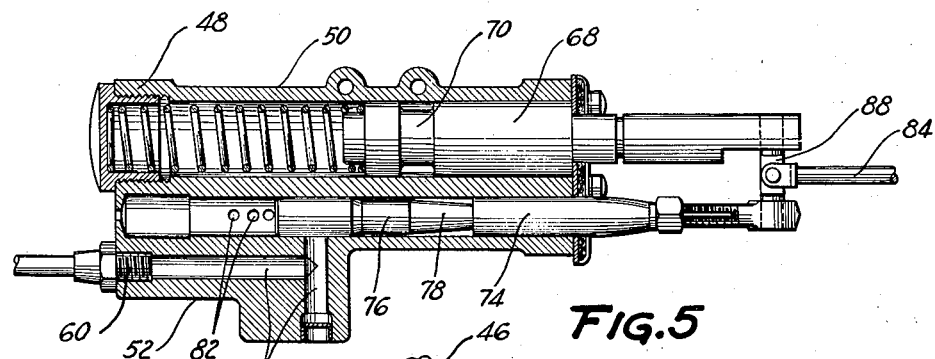
Figure 5 is a sectional view taken on the line 5—5 of Figure 4, said view disclosing the three-way and bleed valves of the valve unit.

A valve unit 48 is incorporated in the connection 46 for controlling the flow of air or power fluid to and from the several compartments of the clutch motor, said unit briefly comprising three distinct valve structures; namely, a three-way control valve 50, a bleed valve 52 and a cut-out valve 54. The valve mechanism is disclosed in detail in Figures 4 and 5 of the drawings and comprises a one-piece housing provided with ports 56, 58 and 60 connected respectively to the two sections of the conduit 46 and to a compression compartment 62 of the clutch motor. A partition 64 in the valve body separating the three-way and cut-out valve structures is provided with a port 66 to intercommunicate the aforementioned ports 56 and 58.

Figure 4:
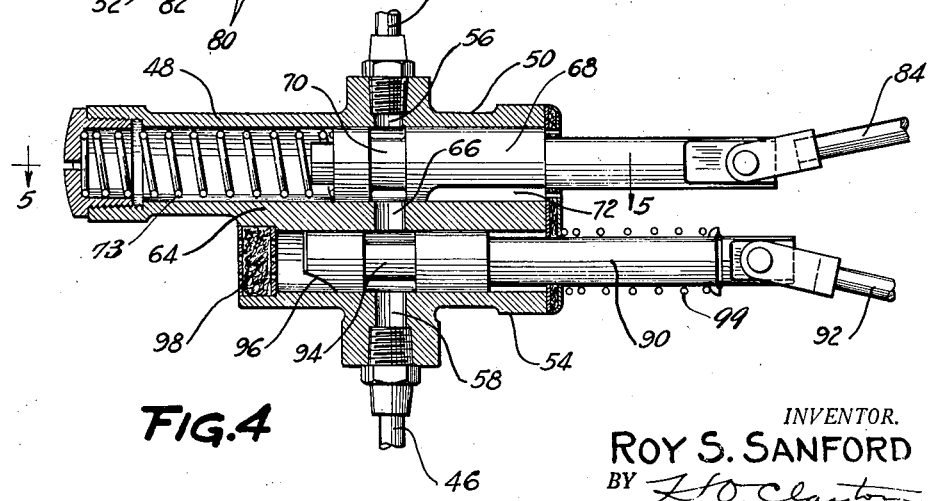
Figure 4 is a vertical sectional view taken through the control valve unit of the power means, said view disclosing the three-way and cut-off valves of the unit.

The three-way valve structure 50 of the valve unit 48 comprises a plunger 68, recessed at 70 to intercommunicate the ports 56 and 66 when the plunger is in its released position, Figure 4, and slotted at 72 to intercommunicate the clutch motor with the atmosphere when the plunger is moved to the left. The plunger 68 is biased to the right to its released position by a return spring 73. The bleed valve structure 52 comprises a plunger 74 reduced in body section at 76 and 78, the latter being tapered, to interconnect a plurality of bores 80 with one or more bleed openings 82 in the body of the valve unit when the plunger is moved to the left, Figure 5. Both the three-way and bleed valve plungers are adapted to be reciprocated within the casing of the valve unit by means of a link 84 pivotally connected at one end 86 to the accelerator operated throttle link 26 and at its other end to a cross bar 88, the latter interconnecting the aforementioned plunger members. The cut-off valve structure of the valve unit comprises a plunger 90, operable by a plurality of foot operated links 92, said plunger being recessed at 94 to intercommunicate ports 66 and 58 with the plunger in its released position, Figure 4, and cut away at 96 to intercommunicate the clutch motor with the atmosphere via an air cleaner 98 when the plunger is moved to the right. As with the plunger 68, the plunger 90 is biased to its released or inoperative position by a spring 99.

Figure 3:
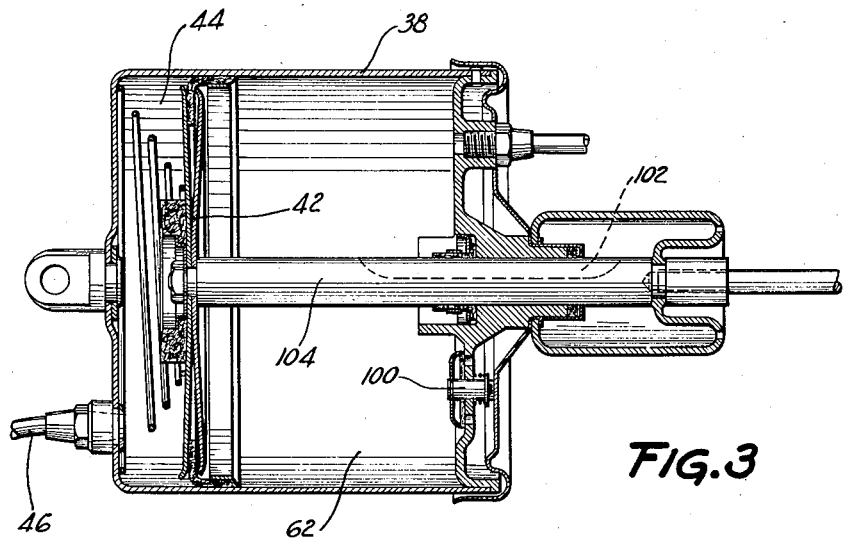
Figure 3 is a longitudinal sectional view of the clutch operating vacuum operated motor of the power means.

Describing now the operation of the clutch operating power mechanism, with the accelerator released and the motor idling there is created a vacuum of some twenty inches of mercury within the manifold 20 by virtue of the pumping action of the engine cylinders. The valve parts with the accelerator released are in their off positions as disclosed in Figure 4. The left end compartment 44 of the clutch motor is then quickly evacuated and the piston 42 is moved to the left, Figures 1 and 3, to disengage the clutch, under the load of the atmosphere entering the right end compartment 62 of the clutch motor via a check valve 100. With operation of the accelerator to open the throttle the three-way and bleed valve plungers 68 and 74 are moved to the left to thus place the left end 44 of the clutch motor in communication with the atmosphere to deenergize the motor and also place the right end of the motor in communication with the atmosphere via the bleed openings 82. The clutch is thus moved into engagement under the action of its spring, the rate of movement being a function of the rate of change of differential acting on the piston 42, the latter rate being determined by the rate of egress of air from the motor via the openings 82. With a slight opening of the throttle there results a relatively slow rate of bleed, inasmuch as the bleed plunger 74 is moved to uncover a relatively small number of the openings 82. However, when the throttle is opened wide, for example, in making a quick shift of the transmission in traffic, the bleed is relatively fast with a consequent rapid engagement of the clutch as is desired. The first stage of movement of the clutch is relatively rapid by virtue of a quick dump of air from the clutch motor via a slot 102 in a rod 104 interconnecting the piston 42 with the clutch. However, when this slot is covered by the end wall of the cylinder the remaining engaging movement of the clutch is controlled by the bleed valve as above explained.

When it is desired to cut out the operation of the power means the operator, with operation of the foot operated links 92, moves the cut-out valve plunger 90 to the right, Figure 4, thus permanently venting the left end 44 of the clutch motor via the air cleaner 98 to render the motor inoperative for the purpose intended. The cutting out of the motor is often effected when it is desirable to use the engine as a brake.

An important feature of the invention lies in the nature of the connection between the piston 42 of the clutch motor and the clutch parts, said connection providing a slack adjusting means for automatically compensating for the normal wear of the friction surfaces of the clutch. The connection comprises a plurality of interconnected links and levers, including a lever 106, pivotally mounted to the chassis at 108. Lever 106 is provided with a bifurcated end, the furcations 110 slidingly receiving a link 112, the latter pivotally connected at 114 with a link 116 secured to the driven friction element 34 of the clutch. A spring 118 is sleeved over the link 112 at its end, said spring being interposed between a stop 120 on the end of the link 112 and one of the furcations 110. A small bell crank lever 122 is pivotally mounted at 124 to the upper end of the lever 106, one end 126 of the bell crank being connected to the motor piston 42 by the connecting rod 104 and the other end 128 of the crank being connected to the link 112 by a link 130, the latter provided at its lower end with a spring clip 132 adapted to frictionally receive the body of the link 112.

Describing now the operation of the slack adjuster mechanism, the first increment of movement of the piston 42 to disengage the clutch serves to rotate the bell crank 122, taking up a degree of lost motion between the clip 132 and link 112 and bringing the clip into frictional contact with the link. The spring 118 is made strong enough to resist movement of the lever 106 to effect this operation, the bell crank fulcruming about its pivot 124. After the clip is moved into frictional contact with the body of the link 112, further movement of the piston serves to rotate the lever 106, binding the link between the furcations 110 and moving the links 112 and 116 to the right to effect the disengagement of the clutch. During this operation the force is transmitted directly through the bell crank 122, link 130 and the friction resisting connection between the clip 132 and link 112, all of the heretofore described parts moving as a unit. The binding or frictional action between the furcations 110 and link 112, together with the friction connection between the clip 132 and link 112, serve to sufficiently disengage the clutch. The pivotal interconnection of the parts of the power mechanism at 40 and 114 provides a structure to compensate for angular movements of said parts as the clutch is being operated.

When the clutch motor is deenergized, as above explained, the aforementioned parts of the connection between the piston and clutch are automatically moved to their clutch engaged position under the action of the conventional clutch springs.

It is to be particularly noted, however, that by virtue of the slip joint between the furcations 110 and the link 112 and the incorporation of the spring 118, the clutch plates will be moved completely into engagement without, however, disturbing the off position setting of the lever 106 as determined by a stop 136. The normal wear of the clutch plates is thus automatically compensated for, the link 112 gradually sliding within the furcations 110, under the action of the clutch spring, to progressively collapse the spring 118 and increase the over-all length of the connection between the driving clutch plate and the piston; accordingly with this construction there need be no adjustment of the parts during the life of the clutch facings.

While one illustrative embodiment has been described, it is not my intention to limit the scope of the invention to that particular embodiment, or otherwise than by the terms of the appended claims.

I claim:

1. In an automotive vehicle provided with a clutch and a pressure differential operated power means for operating the clutch, means interconnecting the reciprocable power element of said power means and the clutch, said means comprising a lever member, means interconnecting one end of said lever member and the clutch, a second lever member mounted on the other end of said first mentioned lever, means interconnecting one end of the second mentioned lever and the aforementioned reciprocable power element of the power means, and a link interconnecting the other end of said second mentioned lever and the means interconnecting the first mentioned lever and clutch.

2. In an automotive vehicle provided with a clutch and a pressure differential operated power means for operating the clutch, means interconnecting the reciprocable power element of said power means and the clutch, said means comprising a lever member, means interconnecting one end of said lever member and the clutch, the connection of said means with the lever member being yieldable, a second lever member mounted on the other end of said first mentioned lever, means interconnecting one end of said second mentioned lever and the aforementioned reciprocable power element, and a link interconnecting the other end of said second mentioned lever and the means interconnecting the first mentioned lever and clutch, the connection between said last mentioned parts comprising means for frictionally interconnecting said parts.

3. In an automotive vehicle provided with a clutch and a pressure differential operated power means for operating the clutch, said means including a reciprocable power element, means interconnecting said power element and the clutch, said means comprising a lever member, a force transmitting means interconnecting said lever member and clutch, a second force transmitting member interconnecting said lever member and aforementioned power element, and a friction operated connection interconnecting the first mentioned force transmitting means with the second mentioned force transmitting means.

4. In an automotive vehicle provided with a clutch and a pressure differential operated power means for operating the clutch, said means including a reciprocable power element, means interconnecting said power element and the clutch, said means comprising a plurality of relatively movable interconnected lever means, force transmitting means interconnecting one of said levers with the clutch, and a second force transmitting means interconnecting another of said levers with the aforementioned power element.

5. In an automotive vehicle provided with a clutch and a pressure differential operated power means for operating the clutch, said means including a reciprocable power element, means interconnecting said power element and the clutch, said means comprising a lever member, a force transmitting means interconnecting said lever member and clutch, said latter means including a yieldable member, a second force transmitting member interconnecting said lever member and aforementioned power element, and a friction operated connection interconnecting the first mentioned force transmitting means with the second mentioned force transmitting means.

ROY S. SANFORD.